(12) United States Patent
Buss

(10) Patent No.: US 7,725,416 B2
(45) Date of Patent: May 25, 2010

(54) METHOD FOR RULE LOCATING, ORDERING AND COMBINING IN A POLYHIERARICHICAL ENVIRONMENT

(75) Inventor: Duane Buss, West Mountain, UT (US)

(73) Assignee: Novell, Inc., Provo, UT (US)

( * ) Notice: Subject to any disclaimer, the term of this patent is extended or adjusted under 35 U.S.C. 154(b) by 542 days.

(21) Appl. No.: 11/610,201

(22) Filed: Dec. 13, 2006

(65) Prior Publication Data

US 2008/0147584 A1    Jun. 19, 2008

(51) Int. Cl.
*G06F 17/00* (2006.01)
*G06N 5/04* (2006.01)

(52) U.S. Cl. .............................. 706/47; 706/46; 706/45

(58) Field of Classification Search ........................ None
See application file for complete search history.

(56) References Cited

U.S. PATENT DOCUMENTS 6,910,040 B2    6/2005    Emmick et al.
2005/0125431 A1    6/2005    Emmick et al.

OTHER PUBLICATIONS

Feeney et al., Kevin, "Policy Based Management for Internet Communications", 2004.*
Ryutaro et al., Ichise, "Rule Induction for Concept Hierarchy Alignment", 2000.*
Lee et al., Jintae, "Partially Shared Views: A Scheme for Communicating among Groups that Use Different Type Hierarchies", 1990.*
Xuhui Ao et al.; A Hierarchical Policy Specification Language, and Enforcement Mechanism, for Governing Digital Enterprises, 2002, 12 pages, Department of Computer Science, Rutgers University.
Paul Ashley, et al., Enterprise Privacy Authorization Language (EPAL 1.2), IBM Research Report, 75 pages.

* cited by examiner

*Primary Examiner*—David R Vincent
*Assistant Examiner*—Adrian L Kennedy
(74) *Attorney, Agent, or Firm*—Haynes and Boone, LLP

(57) ABSTRACT

System and method for rule location, ordering, and combining in a polyhierarchical environment are described. In one embodiment, a polyhierarchical environment contains at least one rule, at least one logical structure representable by a graph and at least two connections between one or more of the logical structures and a rule set evaluator (RSE). The RSE retrieves an assembly definition associated with a particular ordering or combination of rules. Each assembly definition is associated with one or more location chains, and each location chain is associated with one of the connections to a logical structure. For each location chain, a rule location policy is invoked, returning a rule. An assembly policy is invoked upon the returned rules, forming the returned rule into a dataset that conforms to the ordering or combination associated with the assembly definition.

18 Claims, 3 Drawing Sheets

METHOD FOR RULE LOCATING, ORDERING AND COMBINING IN A POLYHIERARICHICAL ENVIRONMENT

BACKGROUND

Rule-based computing organizes statements into a data model that can be used for deduction, rewriting, and other inferential or transformational tasks. The data model can then be used to represent some problem domain and reason about the objects in that domain and the relations between them.

Rule-based approaches are common to many areas of industry. For example, artificial intelligence researchers frequently use rule-based computing to allow computers to come to conclusions in the presence of incomplete information. These rule-based "expert systems" assist and amplify human efforts in drug research, medical diagnosis, network modeling, and computer vision. Another application of rule-based computing, the business rules approach, formalizes an enterprise's critical business rules into a machine-usable form. These business rules not only provide an unambiguous statement of what a business does with information to decide a proposition, but the formal specification also becomes information for process and rules engines to run. Rules-based approaches can also be used in semantic web applications, software engineering, information architecture, and knowledge-management systems.

One subset of rule-based systems is role-based computing systems. A role-based computing system is a system in which identities and resources are managed by aggregating them into "roles" based on job functions, physical location, legal controls, and other criteria. These roles can be used to model organizational structures, manage assets, or organize data. By arranging roles and the associated rules into graphs or hierarchies, these roles can be used to reason about and manage various resources.

In one application, role-based strategies have been used to form a new security model, Role-Based Access Control (RBAC). RBAC associates special rules, called "permissions," with roles; each role is granted only the minimum permissions necessary for the performance of the functions associated with that role. Identities are assigned to roles, giving the users and other entities the permissions necessary to accomplish job functions. This presents a flexible approach while still maintaining separation of duties concepts important to real-world security.

RBAC has been formalized mathematically by NIST and accepted as a standard by ANSI. American National Standard 359-2004 is the information technology industry consensus standard for RBAC, and is incorporated herein by reference in its entirety.

SUMMARY

In one embodiment a system and method for rule location, ordering, and combining in a polyhierarchical environment are described. In one embodiment, a polyhierarchical environment contains at least one rule, at least one logical structure representable by a graph and at least two connections between one or more of the logical structures and a rule set evaluator (RSE). The RSE retrieves an assembly definition associated with a particular ordering or combination of rules. Each assembly definition is associated with one or more location chains, and each location chain is associated with one of the connections to a logical structure. For each location chain, a rule location policy is invoked, returning a rule. An assembly policy is invoked upon the returned rules, forming the returned rule into a dataset that conforms to the ordering or combination associated with the assembly definition.

DETAILED DESCRIPTION

One embodiment includes a system and method for locating, ordering, and combining rules contained in multiple hierarchies or graph structures. To better illustrate the advantages and features of the embodiments, a particular description of several embodiments will be provided with reference to the attached drawings. These drawings, and other embodiments described herein, only illustrate selected aspects of the embodiments and do not limit the scope thereof. For example, "rules" will generally be used to describe various representations of information, operations on that information, a decision point, or evaluation data for a decision point. However, the rules described are meant to encompass policies, permissions, authorizations, authentications, facts, queries, decision points, evaluation data, and similar abstractions. Further, despite reference to specific features illustrated in the example embodiments, it will nevertheless be understood that these features are not essential to all embodiments and no limitation of the scope thereof is thereby intended. For example, some illustrated embodiments are described in reference to "hierarchies" or a "polyhierarchy"; however other graph structures are contemplated and no limitation of the scope is intended. Possible alterations, modifications, and applications of the principles described herein, such as would occur to one skilled in the art, have been omitted for clarity and brevity; nevertheless, it is understood that such alterations, modifications, and applications are contemplated. Furthermore, some items are shown in a simplified form, and inherently include components that are well known in the art. Further still, some items are illustrated as being in direct connection for the sake of simplicity. Despite the apparent direct connection, it is understood that such illustration does not preclude the existence of intermediate components not otherwise illustrated.

Data is often structured in complex polyhierarchical systems, with each level of each hierarchy having contextual significance. Attempts to manage the complexity in these rulesets can result in conglomerated and forced hierarchies that may not reflect the real relationships within the data. Moreover, forced conglomeration makes rule maintenance more difficult. For example, conglomerated rulesets may be large and unwieldy because all objects that have policy are part of the set; conglomerated policy and rule sets must be centrally managed, which is difficult or impossible in a federated or delegated environment; and ensuring separation of duties can be difficult because the conglomerated policy is all-powerful and must be modified to reflect every change.

Figure 1:
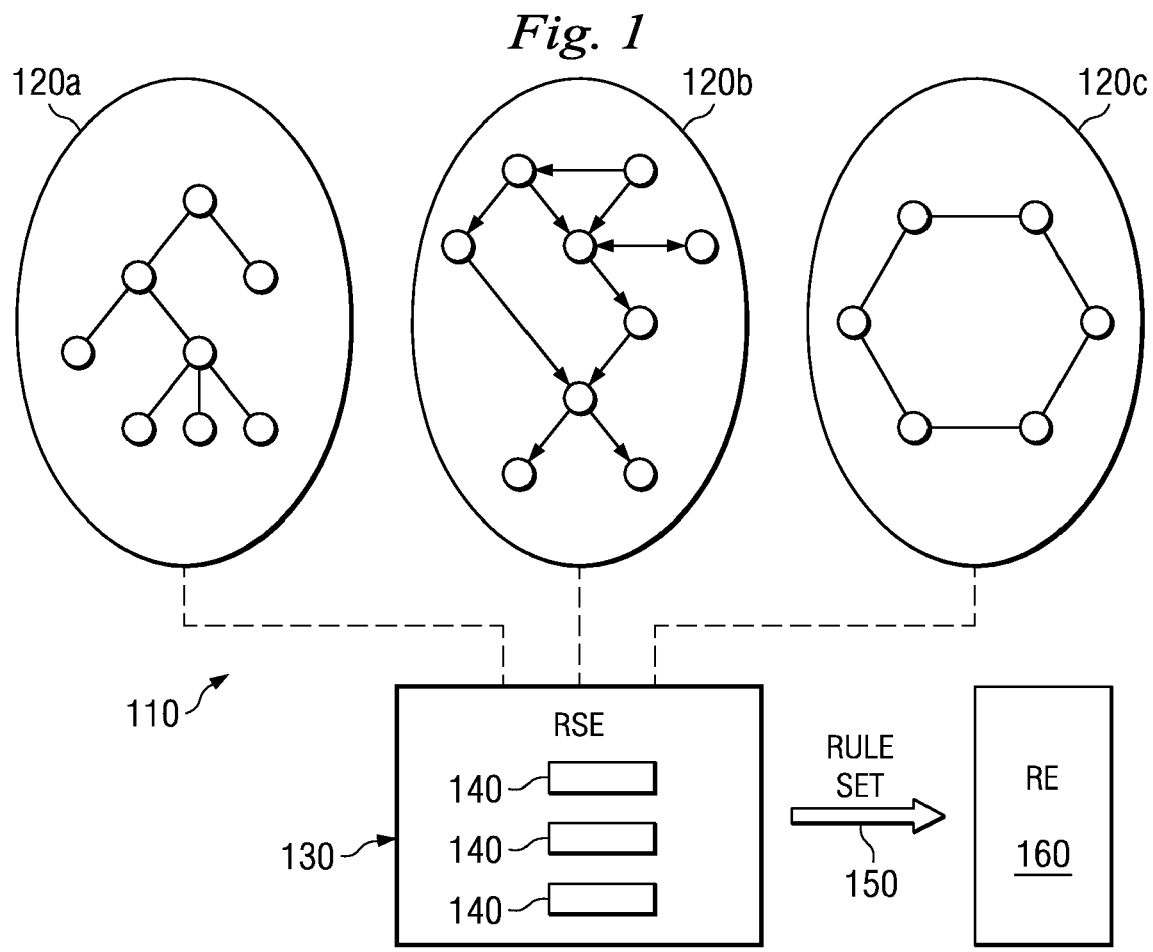
FIG. 1 is a diagram illustrating a system that could benefit through the use of one or more of the embodiments described herein.

FIG. 1 illustrates a system 110 that could benefit from one or more of the embodiments described herein. This system 110 comprises two or more rule hierarchies, represented in FIG. 1 by hierarchies 120a-120c. As will be discussed in detail below, the embodiments described herein avoid the need to force the hierarchies 120a-120c into a single hierarchy and enable the data in the hierarchies to remain separated into its natural form. For example, the illustrated hierarchies 120a-120c actually comprise a traditional hierarchy (120a), a directed acyclic graph ("DAG") (120b), and a ring network (120c). In one embodiment, the different forms of each of the hierarchies 120a-120c reflect different problem domains. In another embodiment, the different forms represent logical, physical, organizational, or geographic structures. In a third embodiment, the different structures represent different loci of control and ownership. In a fourth embodiment, the hierarchies are virtual, composed of links between objects. Whatever the reason for the separation of the structures and the differences in their construction, it may be difficult or impossible to rationalize the different sources into a single structure. Attempting to do so could result in a forced conglomeration less useful than the original structures. Accordingly, one embodiment allows one or more of the source hierarchies 120a-120c to be used without any change in form. A second embodiment may modify a structure in a minor fashion, such as by attaching a node or adding a parent above the entire hierarchy. A third embodiment does not require separate structures; rather, the same structure can be layered onto itself. For example, different views on the same abstract tree can be used to facilitate graph rewriting and optimization.

Continuing with FIG. 1, a connection is established between each of the hierarchies 120a-120c and a Rule Set Evaluator ("RSE") 130. Physically, the RSE 130 can be implemented as one or more computing modules as described below. Logically, there are a number of ways in which the RSE 130 can be connected to the hierarchies 120a-120c. In one embodiment, the RSE 130 can be a common node connecting the hierarchies via standard communication mechanisms. In another embodiment, the RSE 130 can be a virtual or abstract node that does not otherwise participate in the graph. In a third embodiment, the connection between the RSE 130 is solely logical, rather than physical. In another embodiment, the RSE 130 does not participate in any of the hierarchies 120a-120c, but is simply in communication with those hierarchies, such as through a protocol or API.

As will be described in detail below, the RSE 130 comprises one or more assembly definitions 140. By using or executing the assembly definitions 140, the RSE 130 creates a coherent combined ruleset 150 based upon the rule hierarchies 120. The ruleset 150 can then be evaluated by a rule or policy engine 160 to produce a result. In this embodiment, rulesets are evaluated for a particular decision point and set of inputs. The same assembly rule may not always result in the same ruleset because beginning premises might differ.

In general, the ruleset 150 is a set of rules that conforms to the definition of "rule" given below in association with FIG. 3. The combined ruleset 150 is a series of statements that, by virtue of having been brought together in the manner described by the assembly definitions 140, can be used to reason about or compute on, in or about the polyhierarchical domain. Because each rule is a unit, rules may be deleted or added without affecting other rules (though it should affect which conclusions are reached). A rule engine 160 then uses the rules together to come to reasoned conclusions. In some embodiments, the rule engine is deterministic, so it is possible to understand how any conclusion was reached. Other rule engines may be probabilistic, or otherwise nondeterministic, making precise tracing of the result difficult.

In any specific embodiment, the exact format of the ruleset 150 is dependent upon the rule format(s) understood by the rule engine 160. However, several standard options are available. For example, in one embodiment rulesets are expressed in RuleML. In another embodiment RDF triples are used. A third embodiment uses Prolog statements. A fourth embodiment uses quasi-natural language directions or pseudocode to express rules. Further embodiments use proprietary rule expression formats.

The exact workings of the rule engine 160 can also vary. For example, one embodiment uses a custom logic-processing toolkit to analyze the rules. Another embodiment uses one of a number of commonly available rule engines, such as JBoss Rules, JESS, RuleBurst, or Versata. These rule engines may use the Rete algorithm, a later variant such as Rete II or Rete III, or some other pattern matching algorithm. Other embodiments uses other standard searching, selection, or graph algorithms. A further embodiment uses evolutionary algorithms such as fitness, tournament selection, or mutation to reach a conclusion.

Figure 2:
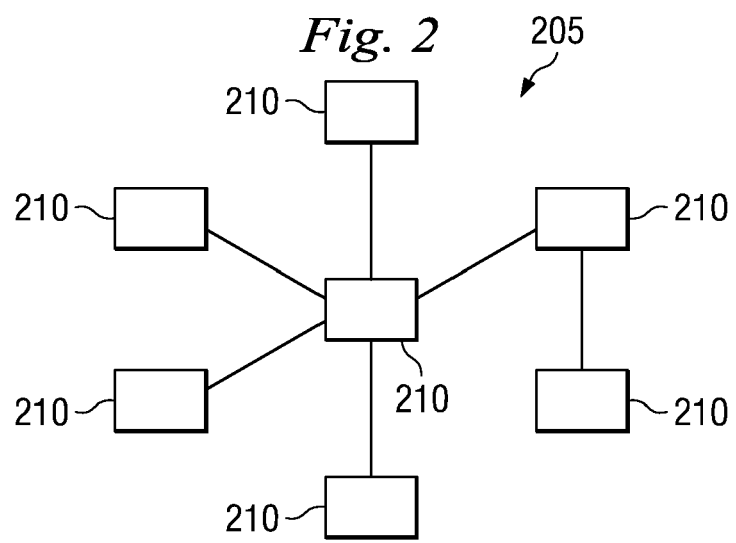
FIG. 2 is a diagram of a exemplary rule hierarchy in accordance with one embodiment.

Referring now to FIG. 2, an embodiment of an object hierarchy is designated by a reference numeral 205. The object hierarchy 205 comprises one or more computing modules 210. The modules 210 may be general-purpose, or they may have dedicated functions such as memory management, program flow, instruction processing, object storage, etc. The modules 210 could be implemented in any way known in the art. For example, in one embodiment a module is implemented in a hardware circuit comprising custom VLSI circuits or gate arrays, off-the-shelf semiconductors such as logic chips, transistors, or other discrete components. One or more of the modules 210 may also be implemented in programmable hardware devices such as field programmable gate arrays, programmable array logic, programmable logic devices or the like.

In another embodiment, one or more of the modules 210 are implemented in software for execution by various types of processors. An identified module of executable code may, for instance, comprise one or more physical or logical blocks of computer instructions that may, for instance, be organized as an object, procedure, or function. Further, the executables of an identified module need not be physically located together, but may comprise disparate instructions stored in different locations that, when joined logically together, comprise the module and achieve the stated purpose for the module. A "module" of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Another embodiment uses higher-level components as modules. For example, a module may comprise an entire computer acting as a network node. A module may also comprise an off-the-shelf or custom program, such as a database management system. These higher-level modules may be decomposable into smaller hardware or software modules corresponding to different parts of a software program and identifiable chips (such as memory chips, ASICs, or a CPU) within a computer.

Continuing with FIG. 2, the modules 210 are logically or physically connected to create one or more object hierarchies, such as the exemplary object hierarchy 205. There are several ways in which these object hierarchies can be arranged. The structure of an object hierarchy 205 can be as simple as a two-node system, or it may be more complex, like a tree, a ring, a DAG, or another structure. The different forms of the object hierarchies imply and maintain different logical relationships between the nodes. In one embodiment, the nodes may be ordered; in another, unordered. Different embodiments may employ arrangements of nodes that imply set operation such as containment or noncontainment, or logical operations such as AND, OR, and XOR. Further, the links between different nodes may or may not be directional.

Various embodiments may vary the physical implementation of the object hierarchy 205. For example, one embodiment implements each node as a higher-level computing module, such as a computer in a distributed system. These nodes may be geographically dispersed and may contain other sub-modules for storage, processing, or other tasks. In another embodiment, the nodes in the hierarchy are logically created via software modules running on a hardware module, such as a directory service running on one or more processing units. Various combinations of hardware and software are possible, as each node may be implemented as any sort of computing module described above. Further, a single object hierarchy may include different types of nodes, such as both hardware and software nodes within the same hierarchy.

An object hierarchy need not be exclusively composed of modules—other objects can be incorporated. Similarly, a variety of modules can participate in an object hierarchy. In one exemplary embodiment, one or more objects are rules or representations of rules, as will be discussed later. In another embodiment, one or more objects are software-defined models such as roles, groups, entities, and identities. Rules are then attached to the objects or defined in relation to the objects. In a third embodiment, one or more objects are physical nodes, such as computing devices, and rules are either defined in relation to the nodes or embedded within the nodes. A fourth embodiment mixes two or more object representations within the same hierarchy. However, in any embodiment in which one or more of the objects in the hierarchy embodies or embeds a rule, has a defined relationship to a rule, or is a rule, the object hierarchy is considered a rule hierarchy. It is appreciated that not every object in the hierarchy needs to be associated with a rule for the object hierarchy to qualify as an rule hierarchy.

Figure 3:
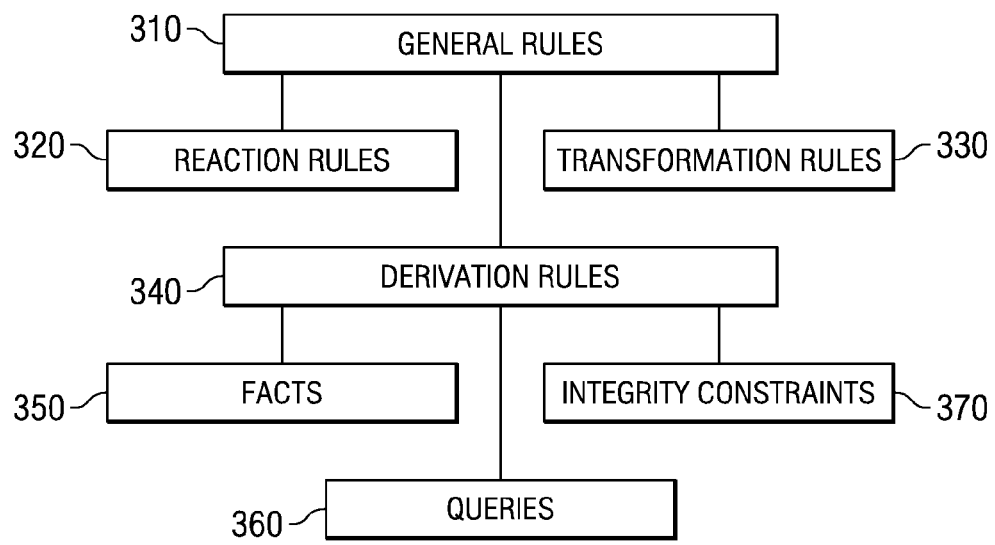
FIG. 3 is a diagram of the relationships between different types of rules in accordance with one embodiment.

Assuming that at least one rule exists in relation to the object hierarchy 205, a logical structure of that rule is described in FIG. 3. The universe of facts and assertions about a model is contained within a set of "positive" general rules 310. Within the context of this embodiment, general rules 310 can consist of reaction rules 320 (event-condition-action rules), transformation rules 330 (functional-equational rules), and derivation rules 340 (implicational-inference rules). The derivation rules 340 can be further specialized to facts 350 ("premiseless" derivation rules), queries 360 ("conclusionless" derivation rules), and integrity constraints 370 (consistency-maintenance rules). One special case is the null rule, which can be represented by a nonexistent rule or an empty ruleset.

These rules can be logically related in several ways. For example, the reaction rules 320 can be reduced to general rules 310 that return no value. Transformation rules 330 can be reduced to general rules whose "event" trigger is always activated. Derivation rules 340 can be reduced to transformation rules that, like characteristic functions, on success just return true. Facts 350 can be reduced to derivation rules that have an empty (hence, "true") conjunction of premises. Queries 360 can be reduced to derivation rules that have, similar to refutation proofs, an empty (hence, "false") disjunction of conclusions or, as in "answer extraction", a conclusion that captures the derived variable bindings. Integrity constraints 370 can be reduced to queries that are "closed" (i.e., produce no variable bindings).

In an alternative embodiment, transformation rules 330 can be reduced to derivation rules over special relations that include an extra argument for transformation values. Derivation rules 340 can be reduced to reaction rules whose "event" trigger is always activated and whose action just adds or "asserts" a conclusion when certain events/conditions (premises) are recognized or fulfilled. Such rules can thus also be applied backward for proving a conclusion from premises. Integrity constraints 370 can be reduced to "denials" or special reaction rules whose only possible kind of action is to signal inconsistency when certain conditions are fulfilled (perhaps after recognizing a trigger event).

Physically, the rules 310-370 can be implemented in various ways. In some embodiments, the rules 310-370 may be composed of computing modules as described above. For example, the rules may comprise an internal table lookup or a pointer to relevant rules. Another module-based embodiment uses RuleML, or RDF to describe the rules. Another module-based embodiment may use bit fields to represent different parts of a rule or several rules together. In a third module-based embodiment, the rules consist of data within a RDBMS and the necessary functions to combine that data. A fourth module-based embodiment may use entries in a directory, such as LDAP, Novell eDirectory, or Active Directory to represent rules. A further module-based embodiment represents rules as electromagnetic potentials within an analog or digital circuit. Other non-module embodiments may use a concrete representations such as keys, documents, or specially-wired circuits. In general, a rule may be represented by anything capable of carrying the necessary semantic meaning, and there is no requirement that any hierarchy or hierarchies share the same rule representation. An advantage of one embodiment is that multiple rule representations can be used simultaneously to produce a result. Another embodiment uses a common rule representation to procure other advantages, such as speed or ease of processing. A third embodiment allows each decision point to define an acceptable rule format without requiring that all rule formats within a given hierarchy be identical.

Figure 4:
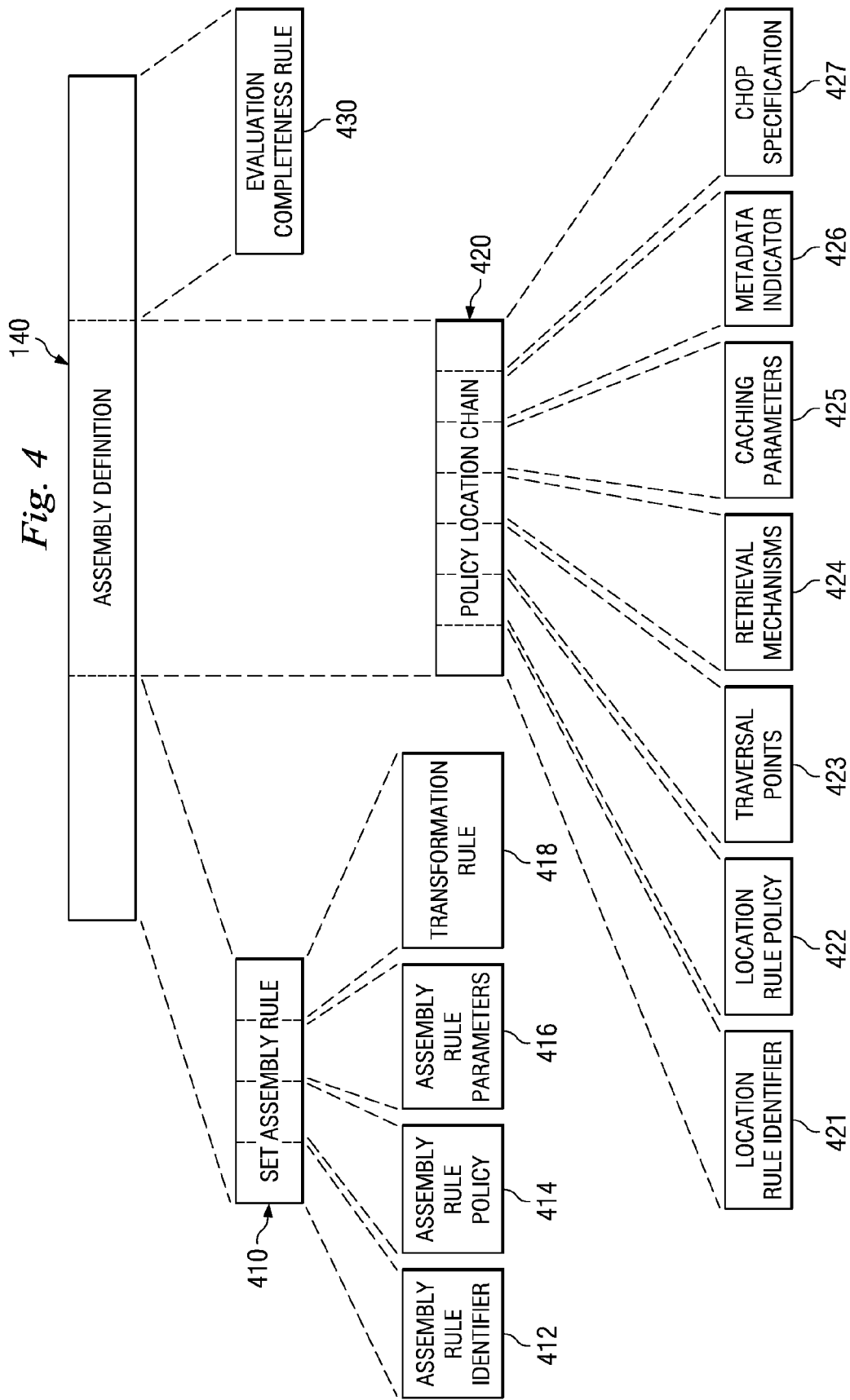
FIG. 4 is a diagram of an assembly definition in accordance with one embodiment.

In FIG. 4, one embodiment of one of the assembly definitions 140 is illustrated. In the embodiment shown in FIG. 4, the assembly definition 140 includes one or more set assembly rule segments 410, one or more policy location chain segments 420, and one or more evaluation completeness rule segments 430. Together, these segments implicitly describe a ruleset. Other embodiments may include other rule segments or rule segment categories, may make one or more rule segments implicit, or may omit one or more rule segments or rules segment categories, or may make the ruleset definition explicit. Further, this embodiment includes within each segment several fields, some of which are marked "optional" and some of which are implicitly required. Other embodiments use different fields, and may make some of the "optional" fields required, and required fields optional. The specification of the fields below relates only to this embodiment, and is not meant to be limiting.

Physically, a number of different assembly definition embodiments are contemplated. One embodiment defines assembly definitions within binary computer code, as structs or records within the data portion of a program or within a file stored on a medium such as a magnetic or optical disc.

Another embodiment defines assembly definitions within code interpreted at runtime, such as an executable pseudocode or an XML-based format. A third embodiment could use a storage and retrieval module, such as a database. A fourth embodiment embeds the assembly definitions within hardware, such as an ASIC, FPGA, or flash RAM. In general, an assembly definition may be defined upon, by, or in relation to any type of computing module discussed above.

In the embodiment illustrated in FIG. 4, the set assembly rule 410 comprises an assembly rule identifier 412, an assembly rule policy 414, optional assembly rule parameters 416, and optional transformation rules 418.

The assembly rule identifier 412 is used to unambiguously identify this particular rule or a particular rule set; in some embodiments, multiple rules are consulted to arrive at a final definition. The assembly rule identifier 412 allows different rules to be chained, combined, or referenced more easily. In other embodiments, the assembly rule identifier is used to identify a particular rule set which is materialized when all inputs are known—possibly just prior to rule evaluation.

The assembly rule policy 414 determines how the rules or policies from the various policy location chains are combined. For example, some hierarchies are inherently ordered and the rule definitions within those hierarchies are designed to take advantage of that ordering. Some embodiments may only support an express or implied partial ordering. Other embodiments deal with hierarchies that are completely unordered or with node rules designed to be idempotent. Further embodiments can embed ordering information within the rules themselves. Other differences arise from differences in containment or directionality in the source rule hierarchy. Further, the rule hierarchies involved will frequently need to have inter-hierarchy weighting applied because the source rule hierarchies will not be anticipating combination. The assembly rule policy 414 is designed to take these differences into account. Some aspects of the potential policies may include, but are not limited to:

- assemble-all-unordered (combine all rules, no ordering need be preserved);
- assemble-all-ordered (preserve ordering between policy location chains, maintaining any ordering of elements within the rule chain)
- assemble-all-ordered-override (where necessary, override ordering between policy location chains, replacing inter-location chain ordering)
- assemble-level-based (mix policies between locations based on level, with variants based upon ordering, subject/root significance, context, etc.)
- assemble-conditional (e.g., if rule from chain ZZZ on is present on subject or root use that, else use rule from chain YYY)
- assemble-pairwise (take each pair of rule hierarchies and merge together, repeating as necessary until assembly is complete)
- assemble-merged (use a three-way or N-way merge process)
- assemble-reversed The optional assembly rule parameters 416 are designed to provide additional information as necessary to provide correct output. What information is necessary, as well as the encoding of that information, is necessarily dependent upon the exact assembly rule policy 414 chosen, as well as the particulars of each embodiment, including the implementation of the various hierarchies. For example, an embodiment that uses an assemble-pairwise rule could use this field to specify the order in which the pairs were merged. Another embodiment embeds sentinel values in this field to compare against information gathered during assembly, allowing for basic looping or branching during ruleset assembly. Other embodiments can use this field to specify additional rules based upon the hierarchy level being considered, overriding rules, etc. At least some embodiments may find it useful to have more than one format for the assembly rule parameters 416.

The option transformation rules 418 are also dependent upon the specific needs of particular embodiments. In general, some rule sets may require minor transformation after retrieval. For example, in one embodiment the policy language within a specific rule hierarchy allows rule ordering to be specified with the rule; however, this ordering can sometimes conflict with the combining and ordering required by a combined rule enforcement point. The option transformation rules 418 provides a rule-specific mechanism for modifying or combining different rules into a form suitable for further use.

The next segment of the assembly definition 140 contains one or more policy location chain segments 420. In this embodiment, each location chain comprises a location chain identifier 421, a location rule policy 422, optional traversal points 423, optional retrieval mechanisms 424, optional caching parameters 425, optional metadata indicators 426, and optional chop specifications 427. Other parameters, including argument fields applicable to one or more of the above fields, are also contemplated.

The location chain identifier 421 is similar to the assembly rule identifier 412; it is used to unambiguously identify this particular rule, making it easier for different rules to be chained, combined, or referenced. However, the format and information contained in the location chain identifier 421 may be different than that used in the assembly rule identifier 412.

The location rule policy 422 is designed to allow the RSE 130 to access the rule hierarchy (or hierarchies) referred to by the current assembly definition. This may involve storing a reference to a hierarchy, an accessor function, a network traversal rule, authentication or authorization credentials, or other instructions. The location rule policy can involve an arbitrary number of actions, possibly affecting different levels of different hierarchies. In one exemplary embodiment, the location policy its embedded within this segment. In another embodiment, the policy is stored somewhere else and the segment only contains a reference or an identifier. A third embodiment applies different rules depending on the current context and the objects involved. For example, one embodiment uses an attribute or optional parameter from the subject as an ascendant or descendant. The result is an implicit target with the hierarchy that is then read. Attributes on the target, such as a parent or sibling node, are then read.

Another embodiment uses different rules depending on object access methods. For example, one embodiment uses both "data" and "operators" as distinct nodes in a hierarchy. The location rule policy has different effects depending on the type of node as well as the context. For example, some nodes cause a dereferencing operation. Other nodes cause a jump to another specified place in the hierarchy. Other nodes cause an attribute access or a hash table lookup. These nodes implicate the surrounding data nodes, such that a dereference operation associated with data "a" has a different result than a dereference associated with data "b." Further, both the data and operator nodes are composable to form higher-level structures.

A third embodiment uses standard protocols. For example, rules and nodes are associated with locations on a network. A standard IP address is used to reach a requested node, after which the node can return the requested information or the request can be proxied into another network segment.

A fourth embodiment uses an identifier, attribute, and a parameter to find a new location. For example, regular-expression-based munging can be applied to dotted hierarchy notation to return a new hierarchy location from which further action can be taken.

The optional traversal points 423 can be used to provide additional context, to define a path, or to bring together different parts of the hierarchies. For example, one embodiment uses "start points," such as the end point of another location chain. Another embodiment uses "end points," such as hierarchy roots, certain administrative areas, and other unique identifiers. A third embodiment defines traversal points including certain levels of the polyhierarchy, certain subjects, a parent node, specific contexts, or specific conditions. Depending on the embodiment, any node, attribute of a node, or condition can be used as a traversal point. In some embodiments, these traversal points can be used as inputs to the location policy 422 or the assembly policy 414.

The policy location chain also includes optional retrieval mechanisms 424. It is assumed that the polyhierarchy may span more than a single data store. Therefore, it may be necessary or convenient in some embodiments to specify a retrieval or traversal mechanism. Some embodiments may include, but are not limited to, directory requests, network protocol requests (such as TCP or UDP packet exchanges, http GET, ftp, webdav, soap, XML-RPC, BXXP, etc), implicit requests (the same as used to get subjects and subject attributes), custom connectors, and file system requests, including remotely-mounted or network-spanning file systems. In some embodiments, this field is complementary to the location policy 422 in that the location policy 422 can, if it is convenient, be limited to logical traversal whereas the retrieval mechanisms 424 can be limited to physical or network traversal.

The optional caching requirements 425 may be used to control or limit caching of retrieval/traversal operations. In some embodiments, the retrieval of rule information from one or more hierarchies can be expensive in terms of time, processor use, or memory. It may be advantageous, therefore, to cache the result of some retrievals so as to promote the more efficient functioning of the network. On the other hand, some embodiments have hierarchies that change dynamically; any information or rules retrieved are stale after their first use. Other embodiments may have alternate retrieval policies depending on the identity of the retriever. In such a case, limitations can be imposed on caching using this field. The implementation of this field can vary between embodiments. Depending on the hierarchies involved, this field may be used to store the caching requirement directly, to store cached values, or to hold pointers to cached values in another data store.

The metadata indicators 426 are used to manage metadata about the various hierarchies. In some embodiments, certain hierarchies may require that the hierarchy be traversed from some precise subject to some endpoint. However, the endpoint may be most significant and the precise subject least significant. This field can store the necessary information to correctly interpret the result of the rule retrieval, such as reordering the rules without a transform. Necessary metadata may be associated with this field by either embedding it within the field or using a pointer or reference within this field to an outside location.

The optional chop specifications 427 can be used to pare down or exclude certain rules or rule chains. For example, one embodiment may associate rules with certain nodes in the hierarchy, with optional overriding by ascendants or descendants. Retrieval of the rule may require the specification of an entire rule chain, including portions irrelevant to the current assembly definition. The chop specifications 427 can be used to trim the retrieved rule(s) after retrieval to better fit with the current assembly definition.

The third segment of the assembly definition 140 is the evaluation completeness rule 430. Evaluation completeness rules will vary between embodiments and can even vary between executions within the same embodiment due to changing circumstances and the various hierarchies that may participate in any given assembly definition. For example, in one embodiment, an evaluation completeness rule is used when creating a coherent combined ruleset to determine when the evaluation is done. In another embodiment, the evaluation completeness rule is used during rule evaluation while traversing the ruleset to determine whether any more rules need to be considered. The evaluation completeness rule 430 helps enable late binding of rule references to actual rules, and may in some embodiments be dependent on the type of decision point being evaluated. Further, some types of evaluation completeness rules may only apply to certain domains. Some aspects of the potential rules may include, but are not limited to:

- eval-RBAC (combine rules based upon a role-based access control model)
- eval-MAC (combine rules based upon a mandatory access control model)
- eval-DAC (combine rules based upon a discretionary access control model)
- eval-first-allow (combine based upon an access control model, going until there is an allowance based upon one or more criteria)
- eval-first-deny (combine based upon an access control model, going until there is a denial based upon one or more criteria)
- eval-level-based (combine until some prescribed hierarchy level has been reached)
- eval-coherent (combine until a logically consistent answer can be ascertained, i.e., stop when there is no ambiguity or when one or more participating hierarchies has been completely traversed)
- eval-report (combine without other controls, simply report the result)
- eval-acyclic (combine to the point that the result can be represented as a DAG; if further expansion of the rulebase creates cycles, stop)
- eval-compliant (combine until the result can be identified as compliant or not compliant with some outside rule)
  Other embodiments may include metadata or other fields within this segment as convenient.

Figure 5:
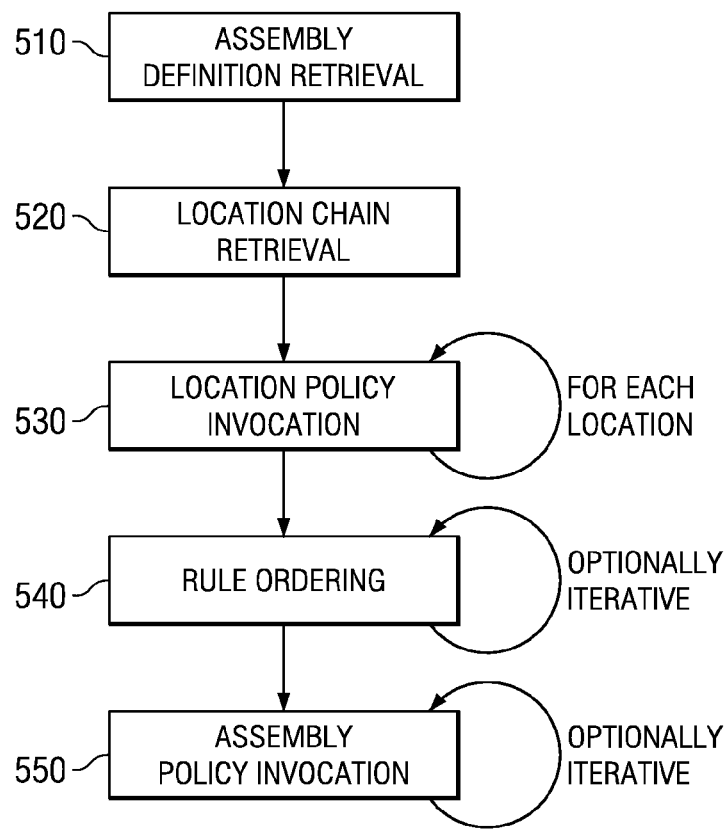
FIG. 5 is a flowchart illustrating different phases of the rule assembly process in accordance with one embodiment.

Turning to FIG. 5, one exemplary method of rule retrieval and combining is illustrated. This embodiment illustrates on-demand retrieval of rules and creation of a ruleset. However, the same method is applicable for preprocessing rules and/or post-retrieval compliance checks.

In the context of this embodiment, assume the existence of at least two rule hierarchies and an RSE 130. Further assume that there is a rule enforcement point defined in which rules from several hierarchies must be evaluated. An enforcement point is a point in the execution of a some action where it is determined a) whether the operation will be performed as requested, b) whether the operation will fail, or c) whether the operation will be transformed. Some embodiments may have simple rules associated with enforcement points, such as cardinality checks on certain numbers. Other embodiments might allow complex expressions, including expressions that check or modify values in the operation itself, in internal or external data stores, and in external systems.

Beginning in step 510, an assembly definition is retrieved from the RSE. As there may be more than one assembly definition in the RSE, the correct assembly definition needs to be retrieved in step 510. In the illustrated embodiment, each decision point has an associated pointer to an assembly definition stored in a computing module. Therefore, assembly definitions are retrieved only as needed when a rule enforcement point is encountered. The RSE 130 follows the pointer and brings the assembly definition into the current working set. Other embodiments may have more than one assembly definition associated with a particular enforcement point.

Upon retrieval of the correct assembly definition in step 510, in step 520, a policy location chain is retrieved. In one embodiment, the location chain is a representation of the path by which the necessary information can be retrieved or accessed. In another embodiment, the location chain is a list of logical "locations" which the search must traverse. For example, one embodiment uses XPATH or XQUERY syntax to represent a location chain. Another embodiment uses a linked list with in-memory pointers. A third embodiment uses a list of instructions in an imperative or declarative language. A fourth embodiment stores location chains in the RSE 130 or in the polyhierarchy. The particular implementation of the policy location chain depends upon the organization and capabilities of the hierarchy associated with the location chain. A further embodiment uses a hybrid location chain to locate information in a database. This hybrid rule chain uses an IP address and port to describe how to find the database server; a "CONNECT" command to describe how to access to the correct database, and then an executable SQL statement to show how to find the correct tables, rows, and columns in the database. In the illustrated embodiment uses the policy location chain segment(s) in the assembly definition to determine which rule location chains are to be retrieved.

In step 530, for each location chain segment in the assembly definition, a location policy therefore is invoked. Specifically, each invocation passes as parameters the location chain identifier 421, the traversal points 423, and necessary metadata indicators 426. Physical traversal is handled according to the directions in the retrieval mechanisms 424, respecting any caching parameters 425. Each invocation returns a list containing all rule locations found, position of the rule with respect to any start/end or traversal points, and the rule if actually retrieved. In some embodiments, retrieval may be delayed until evaluation for performance reasons depending on the evaluation rules and or transformation requirements.

In step 540, rule ordering is performed. In particular, each located rule may have ordering metadata associated with it via the metadata field 426. The RSE uses a sorting algorithm to order policies according to the ordering metadata, preserving information about locations and position of the policy with respect to the start/end point. In this embodiment, for example, any necessary reordering is done via a decorate-sort-undecorate algorithm that preserves the original information. As noted by the recursive arrow at step 540, the number of ordering passes varies based upon the particulars of each rule chain and each embodiment. Depending on the ordering metadata, the ordering may happen zero times, it may happen one time, or it may be an iterative process happening multiple times along several dimensions. The ordering may also occur within the location chain and across multiple location chains.

In step 550, the assembly policy is invoked. In particular, the assembly policy 414 is called on the outputs of the rule ordering performed in step 540. As noted above, possible parameters to the assembly policy include the subject, the location chain sets, any optional assembly parameters, and the evaluation completeness rule 430. In this embodiment, the assembly policy may be iterative, as noted by the recursive arrow at step 550. Satisfaction of the evaluation completeness rule results in a (potentially) ordered list of rules that may then be evaluated using some sort of rule or policy engine.

Several methods of reasoning are available to analyze an assembled ruleset within the rule or policy engine. For example, an rule engine using forward chaining starts with the data available and uses inference rules to make conclusions about further, previously unknown data until a desired goal is reached. In one embodiment, this is accomplished by searching the rules until it finds one in which the if-clause is known to be true. The engine then stores the information contained in the then-clause and adds this information to its data. It continues to do this until a goal is reached.

An engine using backward chaining starts with a list of goals and works backwards to see if there is data that will allow it to conclude any of these goals. An example rule engine using backward chaining searches the inference rules until it finds one with a then-clause that matches a desired goal. If the if-clause of that inference rule is not known to be true, then the if-clause is added to the list of goals. For example, suppose a ruleset contains two rules:

1. If T. Rex is a dinosaur then T. Rex has sharp teeth.
2. If T. Rex has sharp teeth then T. Rex eats animals.

Suppose a goal is to conclude that T. Rex will eat animals. In one embodiment of a backward-chaining engine, the ruleset is searched and rule (2) is selected because its conclusion (the then clause) matches the goal. It is not known that T. Rex has sharp teeth, so this "if" statement is added to the goal list. The ruleset is again searched and this time rule (1) is selected because its then clause matches the new goal just added to the list. This time, the if-clause (T. Rex is a dinosaur) is known to be true and the goal "T. Rex will eat animals" is concluded.

Another embodiment uses a genetic algorithm to analyze random subsets of the ruleset to determine if a particular combination of rules may be useful. The most useful subsets are then kept and randomly combined with other rules, until a complete conclusion is reached. This approach may be particularly suited to massive rulesets or highly parallel computation.

In some embodiments, the entire ruleset does not need to be materialized to reach a conclusion. For example, assume a forward-chaining rule engine used to evaluation authorization data. An assembly definition containing the eval-first-deny or eval-first-allow evaluation completeness rule begins with a starting conclusion and the applicable data. If this data is not sufficient to give an answer, then more rules are added until the ruleset is sufficient to allow or deny the request. At that point, the ruleset can be discarded without having to further marshal data. Other forms of lazy, late-binding, or partial evaluation are possible. For example, another embodiment uses access-time look-up to determine how to connect to any given hierarchy. This allows for the modification or substitution of a hierarchy up until the very point of access.

Other embodiments allow the use of confidences. For example, one embodiment uses fuzzy logic to reason that if T. Rex is a dinosaur, it might be concluded with confidence A that he has sharp teeth; or, if it is known that T. Rex has sharp teeth, it might be concluded with confidence B that he eats animals. These numbers are similar in nature to probabilities, and are meant to imitate the confidences humans use in reasoning. These confidences can be used to express fuzzy sets of answers, or sets of possibilities that may overlap.

To better illustrate one possible use of the embodiments, assume an example embodiment in which there are four hierarchies. These hierarchies correspond to a multi-family genealogical tree, a disease propagation model, a model of trails used to migrate to the west in the 19th century United States, and census data. None of these hierarchies was designed to be explicitly combinable with any other hierarchy. Further, each one of these hierarchies has separate requirements. For example, the disease propagation model and the genealogical tree are inherently directional with time. The disease propagation model is also ordered by the stages of the disease. On the other hand, the trail model is non-directional (you can walk both ways on a trail) and non-ordered (you don't have to walk the trails in any particular order). The census data is hierarchical by geography, the trail model is not. Further, assume these hierarchies are stored in different places. For example, the genealogy tree could be stored in a directory service hosted on a remote server; the trail model is expressed in an XML store. The other hierarchies could be contained within object or relational databases.

In the context of this embodiment, there may be several different assembly definitions depending upon the desired result ruleset. For example, one ruleset could be designed to answer questions regarding the migration of family members during the 19th century; another might track the statistical probability that diseases were passed among certain populations before an outbreak. The assembly definitions used, including the assembly rule policies and the evaluation completeness rules, will vary. Those skilled in the art will appreciate that certain embodiments allow for more flexibility in defining rule and data relations than was previously possible. For example, birth, marriage, and death locations in the genealogical record can be combined with city and camp locations in the trail model. Metadata about the average speed of travel in the 19th century can be combined with the edge weights (distances) between nodes on the trail map to give an idea of time in the context of trail migrations. These trail times can be combined with death times in the genealogical record and incubation times in the disease propagation model. This flexibility allows for the creation of combined rulesets from distinct unconnected models. Further, these combined rulesets allow for the subsequent use of structured reasoning systems like rule engines to derive further knowledge and direct future action.

It is understood that several modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

What is claimed is:

1. A computer-implemented method for rule location, ordering, and combining in a polyhierarchical environment, the polyhierarchical environment comprising at least one rule, at least one logical structure representable by a graph and a plurality of connections between one or more of the logical structures and a rule set evaluator (RSE), the method comprising:

retrieving from a storage medium connected to the computer an assembly definition associated with the RSE, the assembly definition comprising a set assembly rule including an assembly rule policy, at least one location chain, and an evaluation completeness rule and defining a particular ordering, combination, or transformation of rules;

retrieving from a storage medium connected to the computer the at least one location chain, wherein the retrieved location chain is associated with a connection to a logical structure;

for each retrieved location chain, invoking a rule location policy for the retrieved location chain that returns either the null rule or one or more positive rules; and invoking the assembly policy upon the returned rules to produce a dataset that conforms to at least one ordering, combination, and transformation defined by the assembly definition.

2. The computer-implemented method as recited in claim 1, wherein the at least one location chain comprises a first location chain and a second location chain, wherein the first and second location chains correspond to first and second hierarchy targets, respectively.

3. The computer-implemented method as recited in claim 1, wherein the invoking the assembly policy is governed by the evaluation completeness rule.

4. The computer-implemented method as recited in claim 1, wherein a result of the invoking the assembly policy is a ruleset.

5. The computer-implemented method as recited in claim 4 further comprising evaluating the ruleset using a rule engine.

6. The computer-implemented method as recited in claim 4, wherein the ruleset is assembled via one of a late-binding, lazy and partial procedure.

7. The computer-implemented method as recited in claim 4, wherein the ruleset is evaluated using at least one evaluation method selected from a group consisting of a late-binding method, a lazy method, a partial method, a forward-chaining method, a backward-chaining method, an iterative method, a recursive method, a fuzzy method, a confidence-generating method, an evolutionary method, and a method governed by an evaluation completeness rule.

8. The computer-implemented method as recited in claim 1 further comprising, responsive to the invoking the assembly policy, performing a rule ordering in accordance with ordering metadata associated with an object selected from the group consisting of the rule, the polyhierarchical environment, and the RSE.

9. A system for rule location, ordering, and combining in a polyhierarchical environment, the system comprising:

a processor;

storage media associated with and accessible by the processor;

at least one rule hierarchy stored in the storage media and comprising a plurality of computing modules and at least one rule, wherein the rule describes an aspect of a problem domain wherein a plurality of connections are defined between at least one hierarchy and a rule set evaluator module (RSE), the connections providing at least two means whereby the RSE can access one or more rule hierarchies; and at least one assembly definition defining a particular ordering, combination, or transformation of rule, the at least one assembly definition comprising:

a set assembly rule comprising an assembly rule policy for assembling the result into a ruleset;

at least one location chain including instructions whereby the RSE can use a connection to a hierarchy to return a result; and an evaluation completeness rule.

10. The system as recited in claim 9 further comprising a rule engine module for performing logical operations on the ruleset.

11. The system as recited in claim 9, wherein the RSE comprises one or more assembly definitions.

12. The system as recited in claim 9, wherein the assembly definition comprises at least first and second policy location chains, wherein the first and second policy location chains correspond to first and second hierarchy targets, respectively.

13. The system as recited in claim 9, wherein the assembly definition comprises at least one of a set assembly rule, an assembly rule identifier, an assembly rule policy, an assembly rule parameter, a transformation rule, a policy location chain, a location chain identifier, a location rule policy, a traversal point, a retrieval mechanism, a caching parameter, a metadata indicator, a chop specification, an ordering, and an evaluation completeness rule.

14. A system for rule location, ordering, and combining in a polyhierarchical environment, the system comprising:

a processor;

storage media accessible by the processor;

a rule polyhierarchy stored in at least a portion of the storage media, the rule polyhierarchy comprising a plurality of computing modules and at least one rule, wherein the rule describes an aspect of a problem domain;

a rule set evaluator module (RSE), wherein a plurality of connections exist between the polyhierarchy to the RSE, the connections providing at least two means whereby the RSE can access one or more rule hierarchies;

an assembly definition associated with the RSE, the assembly definition comprising a set assembly rule including an assembly rule policy, at least one location chain, and an evaluation completeness rule, the assembly definition defining a particular ordering, combination, or transformation of rules wherein the at least one location chain comprises means for locating and retrieving one or more rules associated with a particular connection to the polyhierarchy; and means for assembling the rules from the plurality of connections into a ruleset, the ruleset conforming to the particular ordering or combination defined.

15. The system as recited in claim 14, wherein the RSE comprises at least a first and a second policy location chain, wherein the first and second location chains correspond to first and second hierarchy targets, respectively.

16. The system as recited in claim 14 further comprising means for assembling the ruleset in one of a partial, late-binding and lazy fashion.

17. The system as recited in claim 14 further comprising a rule engine means for performing logical operations on the ruleset.

18. The system as recited in claim 17 further comprising means for evaluating the ruleset using at least one of a late-binding, lazy, partial, forward-chaining, backward-chaining, iterative, recursive, fuzzy, confidence-generating and evolutionary method.

* * * * *